H. Burt,
Governor.
No. 3,722.  Patented Aug. 31, 1844.
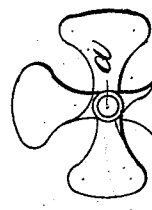
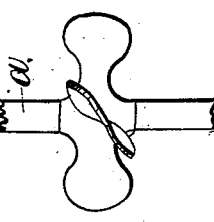
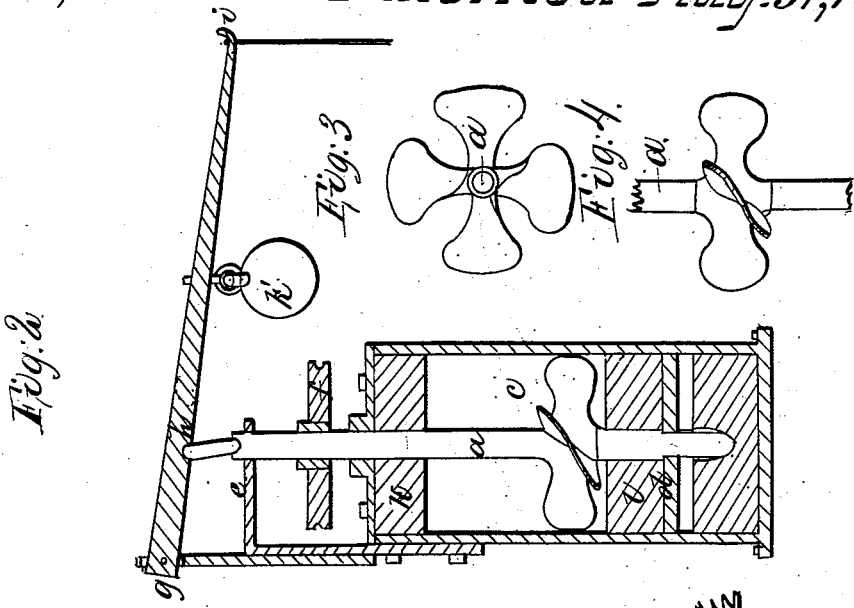
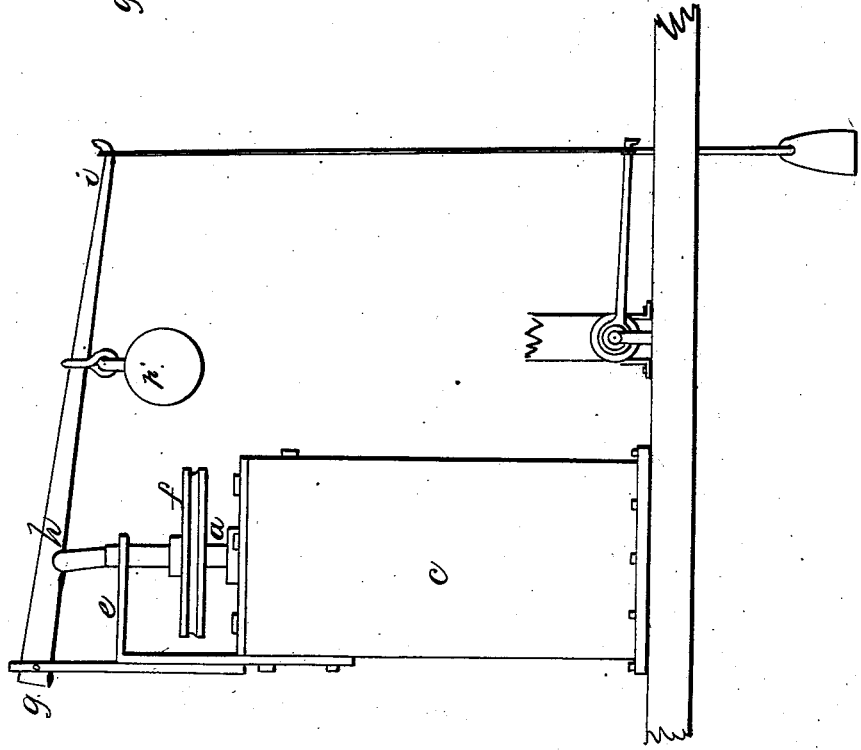

UNITED STATES PATENT OFFICE.

HENRY BURT, OF BOSTON, MASSACHUSETTS.

GOVERNOR FOR REGULATING THE MOVEMENTS OF MILL-WHEELS, STEAM-ENGINES, AND OTHER MACHINERY.

Specification of Letters Patent No. 3,722, dated August 31, 1844.

*To all whom it may concern:*

Be it known that I, HENRY BURT, of Boston, in the county of Suffolk and State of Massachusetts, have invented a new and useful governor for regulating the movements of mill-wheels, steam-engines, or other machinery to which the same may be applicable, and that the following description and accompanying drawings taken together constitute a full and exact specification of the construction and operation of my said invention.

Figure 1 of the drawings above mentioned represent a side elevation of my new governor. Fig. 2 is a vertical and central section of it.

Upon a shaft $a$ (Figs. 1 and 2) I affix what is termed an "Archimedean" screw, or other screw similar in its construction to any of those now used for the propulsion of vessels through the water. The shaft and screw I place in a cylindrical or other proper shaped vessel $c$, filled with water or any other suitable fluid, or in the water of a flume or mill pond or in any other convenient body of liquid of the required extent, and I support the said shaft in bearings $d$, $e$ which will allow of two movements of it—the one a rotary motion on its axis and the other a movement up and down or to and fro in the direction of its axis. A grooved pulley $f$ is to be affixed upon the said shaft as seen in Figs. 1 and 2, or in any other proper manner, and is to receive around its periphery a band which shall proceed from a drum or pulley fixed upon the steam engine or mill wheel shaft, or upon any other suitable part of the mechanism to which the governor is applied. The shaft $a$ should have a lever $g\ h\ i$, or other proper contrivance connected with it, which, by suitable mechanism intervening between it and the throttle valve of the steam pipe of the steam engine, or gate of the water wheel, will open and close the said valve or gate in proportion to the elevation and depression of the shaft in its movements to and fro in the direction of its axis. A top view of a screw propeller with four leaves or floats is given in Fig. 3, and a side view of the same in Fig. 4. The gate or throttle valve should have a spring or other proper contrivance applied to it, which shall throw it open when the screw descends. Although I have described the propeller as a screw propeller I do not mean to be understood to always use one whose leaves or floats are helically curved. A simple circular plate may be converted into a suitable propeller by cutting into the same in one or more directions from the circumference toward its center and bending upward triangular portions of the plate above the rest of the same. Instead of such a propeller one may be constructed of one or more inclined planes attached to and projecting from the shaft. In fact there are various ways in which a propeller may be made to enable it to produce the effect of moving in a direction of its axis, when rotated. When the said screw is arranged in a cylinder filled with water as represented in Figs. 1 and 2, one or more partitions $k$, $l$ may extend across the interior of the cylinder in the parts thereof above and below the limits of motion of the screw, in the direction of the axis of the shaft, or the cylinder may be of so much greater diameter than the screw as to admit of a series of vertical plates being secured to its inner surface and between the same and the screw and extending nearly to the screw; the object of the said partitions or plates being to prevent as far as possible for those to, a rotary motion of the water above and below or around the screw, while the screw is revolving. I do not consider these plates however, as making part of my invention, but as only auxiliary thereto for the purpose of preventing a rotary motion of the water in the immediate vicinity of the screw. When the shaft $a$ and screw are put in rapid revolution within the water or fluid matter surrounding the latter, the reaction of the water upon the screw, will raise the screw and shaft $a$, or give to them a motion in a direction of the axis of the shaft so as to diminish the opening of the throttle valve of the engine or gate of the water wheel. As the velocity of the screw is increased it will rise still higher and still further diminish the size of the opening of the gate or throttle valve.

Every mechanic acquainted with the operation of the ordinary double ball governor must have observed its irregularity of action, the same occurring every time a stoppage of any material part of the mechanism put in motion by the water wheel or steam engine takes place. It often happens, in cotton factories, that suddenly arresting the operations of the selfacting mules or any other considerable portion of the mechanism so, for a short period of time, increases the speed of the remainder of the same, before the governor can properly act upon the moving power, as often to create great damage. In fact the throwing the shuttles entirely out of the looms and with great force is a common accident of almost daily occurrence, the effects of which are sometimes very serious. The peculiar manner in which the ordinary governor is constructed and acts prevents it from producing the necessary effect within the required time. Without going into further particulars, it is sufficient to state the well known fact that the said governor is an imperfect mechanical contrivance for the purpose for which it is intended. It is an established law of physics that the resistance to a body moving in water increases in or about in the proportion of the square of the velocity. Consequently it will be observed that the moment an increase takes place in the velocity of the screw and its shaft, the resistance to the said screw or power acting to move it in the direction of its axis increases about in the proportion of the square of the velocity. This causes the screw to instantly act upon the throttle valve or gate (as the case may be) and to the degree necessary to diminish the passage of the steam to the engine or water to the wheel.

The lever which is raised by the screw shaft may have a weight $k'$, suspended to it and so adapted to it as to be capable of being moved toward the extreme end of the lever, or toward the shaft $a$, as circumstances may require. Suitable marks or notches and figures may be made in the lever to indicate the speed which the adjustment of the weight upon either of the said notches will produce. When the machinery is running at any particular speed the weight should be so adjusted as to cause the speed imparted to the screw to elevate it and balance it in the water to a certain fixed level or position, which may be midway between the limits of space assigned for the screw to move in the direction of the axis of the shaft $a$. Any increase of speed of the screw will, of course, instantly raise it and diminish the opening of the gate or throttle valve. So with any decrease of the speed, the screw will fall and increase the opening of the gate or throttle valve. The great advantages which my governor possesses over the ordinary governor above mentioned consists in its simplicity, cheapness of construction and immediate action to govern or regulate the motions of the mechanism.

Having thus explained my invention I shall claim—

The employment, as a governor, of a screw or other analogous contrivance as described to revolve in water or other fluid and act therein and in all respects substantially as set forth.

HENRY BURT.

Witnesses:
R. H. EDDY,
JOHN NOBLE.